(12) United States Patent
Shiokawa et al.

(10) Patent No.: US 11,400,637 B2
(45) Date of Patent: Aug. 2, 2022

(54) LIQUID BLOW MOLDING METHOD

(71) Applicant: YOSHINO KOGYOSHO CO., LTD., Tokyo (JP)

(72) Inventors: Mitsuru Shiokawa, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/760,384

(22) PCT Filed: Oct. 3, 2018

(86) PCT No.: PCT/JP2018/037103
§ 371 (c)(1),
(2) Date: Apr. 29, 2020

(87) PCT Pub. No.: WO2019/106954
PCT Pub. Date: Jun. 6, 2019

(65) Prior Publication Data
US 2020/0331186 A1    Oct. 22, 2020

(30) Foreign Application Priority Data
Nov. 29, 2017    (JP) .............................. JP2017-229309

(51) Int. Cl.
*B29C 49/46*    (2006.01)
*B29C 49/42*    (2006.01)
(Continued)

(52) U.S. Cl.
CPC .......... *B29C 49/46* (2013.01); *B29C 49/4252* (2013.01); *B29C 2049/4664* (2013.01);
(Continued)

(58) Field of Classification Search
CPC ................ B29C 49/46; B29C 49/4252; B29C 2049/4664; B29C 49/12; B29C 49/64;
(Continued)

(56) References Cited

U.S. PATENT DOCUMENTS 5,650,104 A      7/1997 Ibar
10,836,094 B2 *  11/2020 Okuyama ............... B29C 49/18
(Continued)

FOREIGN PATENT DOCUMENTS

DE    10 2014 016 140 A1    5/2016
EP        2 860 016 A1       4/2015
(Continued)

OTHER PUBLICATIONS

Dec. 18, 2018 International Search Report issued in International Patent Application No. PCT/JP2018/037103.
Jul. 9, 2021 Search Report issued in European Patent Application No. 18883177.
(Continued)

*Primary Examiner* — Jeffrey M Wollschlager
*Assistant Examiner* — Shibin Liang
(74) *Attorney, Agent, or Firm* — Oliff PLC

(57) ABSTRACT

A liquid blow molding method of molding a synthetic resin preform having a mouth portion into a liquid container of a predetermined shape, including: an air-liquid replacement step of supplying a liquid into the preform from the mouth portion through a blow nozzle and discharging the air inside the preform to the outside; an air-liquid separation step of separating the air from the liquid inside the preform by vibrating the preform; and a blow molding step of molding the preform into a container of a predetermined shape by supplying a pressurized liquid into the preform from the mouth portion through the blow nozzle, after the air-liquid separation step.

8 Claims, 8 Drawing Sheets

(51) Int. Cl.
  *B29K 23/00* (2006.01)
  *B29K 67/00* (2006.01)
  *B29L 31/00* (2006.01)

(52) U.S. Cl.
  CPC .... *B29K 2023/12* (2013.01); *B29K 2067/003* (2013.01); *B29L 2031/7158* (2013.01)

(58) Field of Classification Search
  CPC .......... B29K 2023/12; B29K 2067/003; B29L 2031/7158
  See application file for complete search history.

(56) References Cited

U.S. PATENT DOCUMENTS

| 2016/0089828 | A1  | 3/2016 | Desoutter et al. |
| 2016/0229108 | A1* | 8/2016 | Aoki ........................ A61L 2/10 |
| 2018/0178437 | A1* | 6/2018 | Desoutter ............... B29C 49/46 |

FOREIGN PATENT DOCUMENTS

| EP | 2 902 169 A1 | 8/2015 | |
| EP | 3 109 029 A1 | 12/2016 | |
| JP | 2004-041846 A | 2/2004 | |
| JP | 2015-066921 A | 4/2015 | |
| JP | 5806929 B2 | 11/2015 | |
| WO | 2000012290 | * 9/2000 | ............. B29C 49/64 |
| WO | 2016066276 | * 10/2015 | ............. B29C 49/12 |
| WO | 2016066276 A1 | 5/2016 | |
| WO | 2017187698 A1 | 11/2017 | |

OTHER PUBLICATIONS

Jul. 2, 2021 Office Action issued in Chinese Patent Application No. 201880075324.8.

Jan. 18, 2022 Office Action issued in Chinese Patent Application No. 201880075324.8.

May 20, 2022 Office Action issued in Chinese Patent Application No. 201880075324.8.

* cited by examiner

LIQUID BLOW MOLDING METHOD

TECHNICAL FIELD

The present disclosure relates to a liquid blow molding method of molding a synthetic resin preform having a mouth portion into a liquid container of a predetermined shape.

BACKGROUND

Synthetic resin containers, representative examples of which including polypropylene (PP) bottles and polyethylene terephthalate (PET) bottles, are used to contain, as content liquids, various liquids such as beverages, cosmetics, medicines, detergents and toiletries such as shampoos. Such containers are generally manufactured by blow molding a preform formed of a thermoplastic synthetic resin material described above into a bottomed tubular shape, for example.

As a blow molding for molding a preform into a container, a liquid blow molding is known, in which, as a pressure medium supplied into a preform, a pressurized liquid is used instead of pressurized air.

For example, Patent Literature (PTL) 1 discloses a liquid blow molding method in which a synthetic resin preform heated in advance to a temperature at which stretchability is achieved is placed in a mold for blow molding, and a liquid pressurized to a predetermined pressure is supplied into the preform through a blow nozzle. In this manner the preform is molded into a container of a predetermined shape conforming to a cavity of the mold. According to the liquid blow molding method described above, as a liquid supplied into a preform, a content liquid such as beverage contained finally in a container as a product is used, and molding of a container and filling of a content liquid into the container are performed at the same time, which facilitates easy molding (production) of a liquid container containing a content liquid. In this manner, a step of filling a content liquid into a container after molding is omitted, and thus a configuration of its production process or production line (apparatus) can be simplified.

On the other hand, in a known filling apparatus configured to fill a content liquid into a container, a liquid is irradiated with ultrasonic waves in a passage through which the liquid is fed toward the container to separate the air mixed in the liquid from the liquid before the liquid is filled into the container (see, for example, PTL 2).

CITATION LIST

Patent Literature

PTL 1: JP5806929 (B2)
PTL 2: JP2004041846 (A)

SUMMARY

Technical Problem

In the liquid blow molding method disclosed in PTL 1, when a liquid supplied as a pressure medium to a preform contains the air, bubbling of the liquid occurs in the preform, which may cause a problem such as a decline in stability of molding conditions, moldability of a container, and the like.

In order to address the problem described above, it is considered that a filling apparatus disclosed in PTL 2 is used to remove the air from the liquid supplied to the preform in advance before a liquid blow molding is performed.

However, with the filling apparatus disclosed in PTL 2, there are concerns about mixing of the air into the passage after the air is removed. Further, in the liquid blow molding method, a liquid supplied as a pressure medium to a preform is supplied into the preform while entraining the air present inside the preform. Thus, even if a liquid from which the air is removed in advance is supplied to the preform by using the filling apparatus as disclosed in PTL 2, bubbling of the air cannot be sufficiently prevented.

Moreover, when a suck-back step of sucking back a predetermined amount of liquid from a container after molding is performed after a liquid blow molding, the air entrained in the liquid during the liquid blow molding is returned into a passage of the liquid through suck back, and it is difficult to remove the air from the sucked back liquid by using the filling apparatus disclosed in PTL 2.

The present disclosure has been conceived in view of the above described problem, and is to provide a liquid blow molding method in which a liquid container can be manufactured to have a predetermined content volume and a shape precisely and at a low cost.

Solution to Problem

A disclosed liquid blow molding method is a liquid blow molding method of molding a synthetic resin preform having a mouth portion into a liquid container of a predetermined shape, the method including: an air-liquid replacement step of supplying a liquid into the preform from the mouth portion through a blow nozzle and discharging the air inside the preform to the outside; an air-liquid separation step of separating the air from the liquid inside the preform by vibrating the preform; and a blow molding step of molding the preform into a container of a predetermined shape by supplying, after the air-liquid separation step, a pressurized liquid into the preform from the mouth portion through the blow nozzle.

In the disclosed liquid blow molding method configured in the above described manner, preferably, the air-liquid separation step is also performed while the air-liquid replacement step is performed.

In the disclosed liquid blow molding method configured in the above described manner, preferably, the air-liquid separation step is performed after the air-liquid replacement step is completed.

In the disclosed liquid blow molding method configured in the above described manner, preferably, in the air-liquid separation step, the preform is vibrated by applying ultrasonic waves to the preform or a mold in which the preform is placed.

In the disclosed liquid blow molding method configured in the above described manner, preferably, in the air-liquid separation step, the preform is vibrated by bringing a vibration body into contact with the preform or the mold in which the preform is placed.

The disclosed liquid blow molding method configured in the above described manner includes a nozzle engagement step of engaging the blow nozzle with the mouth portion, before the air-liquid replacement step. In the air-liquid replacement step, preferably, the air inside the preform is discharged to the outside from a discharge port provided separately from a liquid supply port in the blow nozzle while a liquid is supplied into the preform from the mouth portion through the liquid supply port of the blow nozzle.

The disclosed liquid blow molding method configured in the above described manner includes a first nozzle lowering step of lowering the blow nozzle to a first position at which the mouth portion is not sealed, before the air-liquid replacement step. In the air-liquid replacement step, the air inside the preform is discharged to the outside from a gap between the blow nozzle and the mouth portion while a liquid is supplied into the preform from the mouth portion through the blow nozzle located at the first position. The method further includes a second nozzle lowering step of lowering the blow nozzle to a second position at which the mouth portion is sealed, after the air-liquid replacement step. Preferably, the blow molding step is performed after the second nozzle lowering step.

The disclosed liquid blow molding method configured in the above described manner preferably includes a suck-back step of sucking back a predetermined amount of liquid from the container after molding through the blow nozzle, after the blow molding step.

Advantageous Effect

According to the present disclosure, a liquid blow molding method can be provided, in which a liquid container can be manufactured to have a predetermined content volume and a shape precisely and at a low cost.

DETAILED DESCRIPTION

The present disclosure will be described in more detail below with reference to the drawings.

The disclosed liquid blow molding method is a liquid blow molding method of molding a synthetic resin preform having a mouth portion into a liquid container of a predetermined shape. The method includes: an air-liquid replacement step of supplying a liquid into the preform from the mouth portion through a blow nozzle and discharging the air inside a preform to the outside; an air-liquid separation step of separating the air from the liquid inside the preform by vibrating the preform; and a blow molding step of molding the preform into a container of a predetermined shape by supplying, after the air-liquid separation step, a pressurized liquid into the preform from the mouth portion through the blow nozzle. The disclosed liquid blow molding method described above can be said as a liquid container manufacturing method of manufacturing a liquid container containing a content liquid from a preform.

Figure 1:
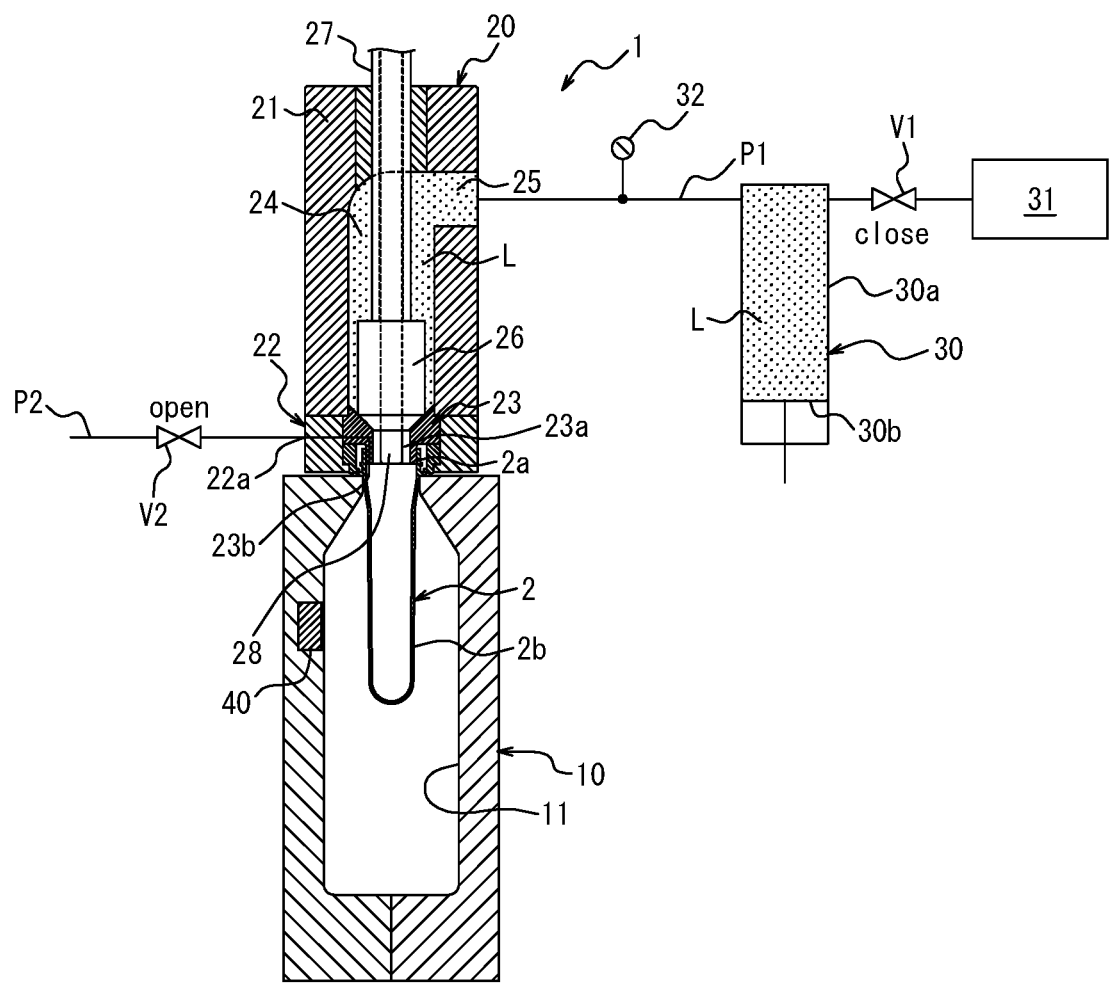
FIG. 1 is a diagram illustrating an example of a liquid blow molding apparatus used for a liquid blow molding method according to an embodiment of the present disclosure.

The disclosed liquid blow molding method can be performed by using a liquid blow molding apparatus 1 configured as illustrated in FIG. 1, for example.

The liquid blow molding apparatus 1 illustrated in FIG. 1 molds a synthetic resin preform 2 into a liquid container containing a content liquid by liquid blow molding. Here, the liquid blow molding is a blow molding in which, as a pressure medium (pressurized fluid) supplied to the preform 2, a pressurized liquid is used instead of a pressurized air used for air blow molding.

As the liquid L supplied to the preform 2, that is, the content liquid L contained in a liquid container after molding, a variety of liquids such as, for example, beverages, cosmetics, medicines, detergents and toiletries such as shampoos can be used.

As the preform 2, preferably, a preform formed by a thermoplastic synthetic resin material such as polypropylene (PP) and polyethylene terephthalate (PET), for example, into a bottomed tubular shape having a cylindrical mouth portion 2a, which is an open end, and a cylindrical body portion 2b continuing to the mouth portion 2a and having a closed lower end is used.

It is to be noted that the shape of the preform 2 is not limited to the above described one, and a preform 2 having a variety of shapes can be used according to the shape, etc., of the container after molding, as long as it has a mouth portion 2a.

Although not illustrated in detail, on the outer wall surface of the mouth portion 2a of the preform 2 is provided with an engaging protrusion configured to mount a plug cap (not illustrated) to the mouth portion 2a of the liquid container after molding by plugging (undercut engagement). It is to be noted that, instead of the engaging protrusion, a male thread may be provided to the outer wall surface of the mouth portion 2a so as to mount the plug cap to the mouth portion 2a through thread connection.

The liquid blow molding apparatus 1 has a mold for blow molding 10. The mold 10 has a cavity 11 having a shape corresponding to a final shape of a container, such as a bottle shape, for example. The cavity 11 opens upward on the upper surface of the mold 10. The preform 2 is placed in the mold 10 with the body portion 2b disposed inside the cavity 11 of the mold 10 and with the mouth portion 2a protruded upward from the mold 10.

Although not illustrated in detail, the mold 10 can be opened right and left, and after the preform 2 is molded into a liquid container, the liquid container can be ejected from the mold 10 by opening the mold 10 right and left.

Above the mold 10 is provided with a nozzle unit 20 configured to supply a liquid L into the preform 2. The nozzle unit 20 has a main body block 21, and the main body block 21 is vertically displaceable relative to the mold 10. The lower end of the main body block 21 is provided with a support block 22, and a blow nozzle 23 is mounted to the lower end of the main body block 21 by being supported by the support block 22. The blow nozzle 23 is formed into a substantially cylindrical shape, and when the nozzle unit 20 is displaced relative to the mold 10 to a stroke end in a direction approaching the mold 10, the blow nozzle 23 is engaged hermetically, from above, with the mouth portion 2a of the preform 2 placed in the mold 1.

Figure 2:
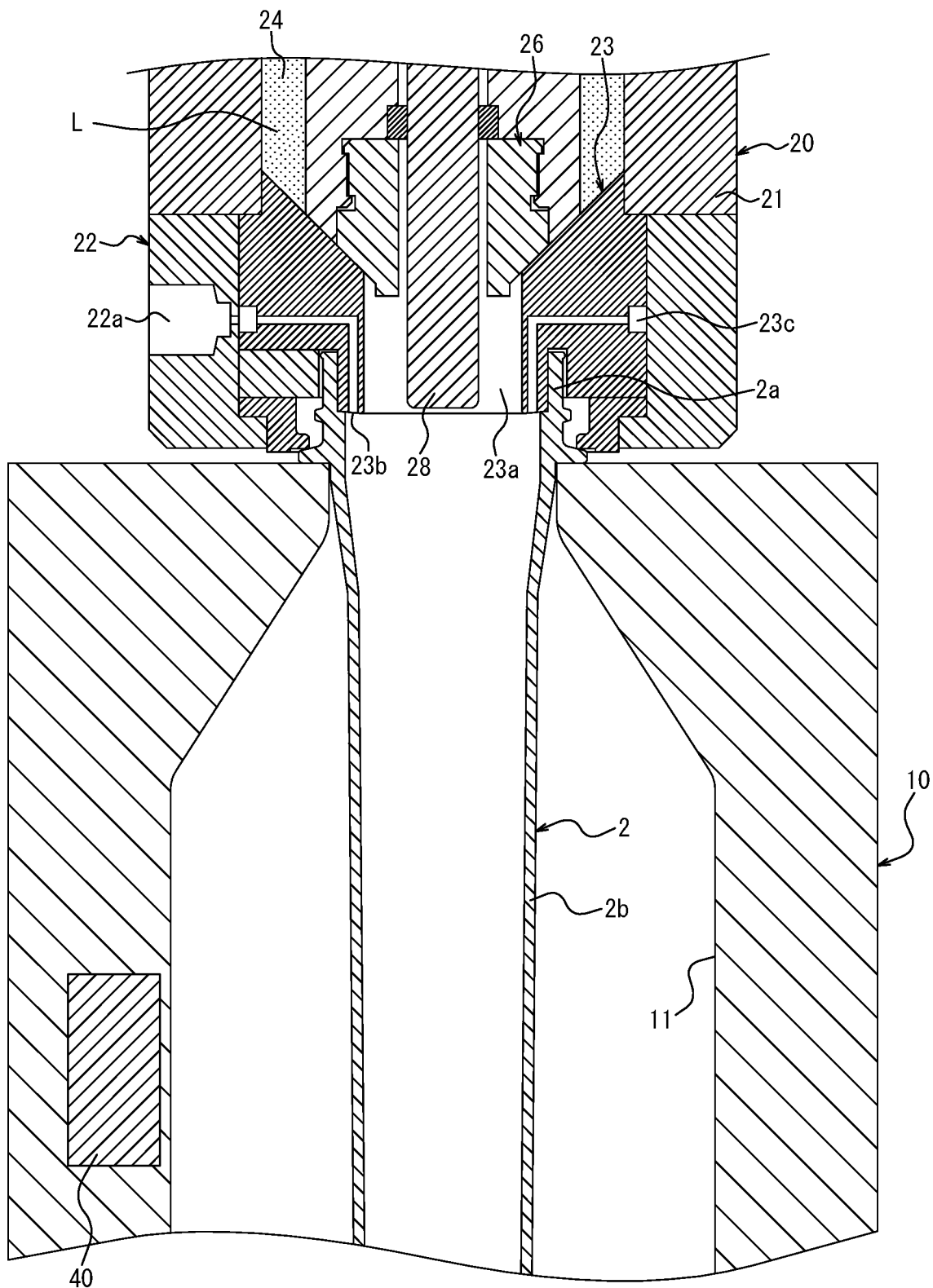
FIG. 2 is an enlarged view of a main part of the liquid blow molding apparatus illustrated in FIG. 1.

As illustrated in FIG. 2, inside the cylindrical portion of the blow nozzle 23 is a liquid supply port 23a. Further, in the cylindrical portion forming the liquid supply port 23a of the blow nozzle 23 is provided with a discharge port 23b that opens at the lower end of the cylindrical portion. In the present embodiment, the cylindrical portion of the blow nozzle 23 is provided with eight discharge ports 23b that are circumferentially arranged side by side at regular intervals. The number thereof may be changed.

As illustrated in FIG. 1, inside the main body block 21 is provided with a supply channel 24 that extends in the vertical direction. The supply channel 24 is a flow channel configured to supply liquid L to the liquid supply port 23a of the blow nozzle 23, and communicates with the liquid supply port 23a of the blow nozzle 23 at the lower end thereof.

The main body block 21 is also provided with a supply port 25 that communicates with the upper end of the supply channel 24.

Inside the supply channel 24 is provided with a seal body 26 configured to open/close the liquid supply port 23a of the blow nozzle 23. The seal body 26 is fixed to the lower end of a shaft body 27 provided vertically displaceable relative to the nozzle unit 20, and is vertically displaceable inside the supply channel 24. The seal body 26 is formed into a columnar shape. When the seal body 26 is displaced to the close position, which is a stroke end position on the lower side, it comes in contact with the upper surface of the blow nozzle 23 on the lower end surface thereof and closes the liquid supply port 23a of the blow nozzle 23. On the other hand, when the seal body 26 is displaced upward from the close position, the liquid supply port 23a of the blow nozzle 23 is opened and communicated with the supply channel 24. It is to be noted that the seal body 26 may be formed integrally with the shaft body 27.

As illustrated, the liquid blow molding apparatus 1 may include a stretching rod 28. The stretching rod 28 is inserted into a shaft center of the shaft body 27 to be vertically displaceable relative to the shaft body 27, and is provided to be extendable and retractable from the lower end of the seal body 26 through the shaft center of the seal body 26. The stretching rod 28 is driven by a driving source not illustrated and is displaced downward, thus can axially stretch the preform 2. In this manner, when the stretching rod 28 is provided, the liquid blow molding apparatus 1 can perform a biaxial stretch blow molding in which the preform 2 is stretched axially by the stretching rod 28 and is stretched radially by a pressurized liquid L supplied from the mouth portion 2a.

It is to be noted that the liquid blow molding apparatus 1 may not include the stretching rod 28, and may be configured to liquid blow mold the preform 2 by using a pressurized liquid L only.

A pump 30 is connected to the supply port 25 through a pipe P1. The pump 30 can be configured as a plunger pump including a cylinder 30a and a piston (plunger) 30b, for example.

A supply tank 31 is connected to the pump 30. The supply tank 31 can be configured to store a liquid L and to heat the liquid L up to a predetermined temperature and hold the liquid L at the temperature. A flow channel between the pump 30 and the supply tank 31 is provided with an opening-closing valve V1, and the flow channel can be opened/closed by the opening-closing valve V1. It is to be noted that the reference sign 32 represents a pressure gauge provided to the pipe P1.

As illustrated in FIG. 2, each of a plurality of discharge ports 23b provided in the blow nozzle 23 is communicated, through flow channels, with a connection channel 23c provided annularly on the outer periphery of the blow nozzle 23, each of the flow channels extending upward and bending radially outward. The connection channel 23c is connected to a connection port 22a on the side of the support block 22. As illustrated in FIG. 1, a pipe P2 is connected to the connection port 22a, and the connection port 22a is connected to a discharge tank (not illustrated) through the pipe P2. That is, a plurality of discharge ports 23b provided in the blow nozzle 23 are each connected to the discharge tank. It is to be noted that, the pipe P2 may be connected also to a suction pump for discharge, instead of a discharge tank. The pipe P2 is provided with an opening-closing valve V2 that opens and closes the pipe P2.

The pump 30 operates in a positive direction (a pressurized direction) with the seal body 26 displaced upward to open the liquid supply port 23a and with the opening-closing valve V1 closed. In this manner, the liquid L pressurized up to a predetermined pressure can be supplied into the preform 2 through the pipe P1, the supply port 25, the supply channel 24 and the liquid supply port 23a of the blow nozzle 23. Further, the pump 30 operates in a reverse direction with the liquid supply port 23a closed by the seal body 26 and with the opening-closing valve V1 open. In this manner, the liquid L stored in the supply tank 31 is sucked into the cylinder 30a so as to be prepared for the next liquid blow molding.

The liquid blow molding apparatus 1 is provided with a vibration generator 40 configured to vibrate the preform 2. In the case illustrated in figures, the vibration generator 40 is provided as an ultrasonic wave generator configured to generate ultrasonic waves, and is provided in the mold 10. The vibration generator 40 generates ultrasonic waves (sonic waves with a frequency of 20 kHz) inside the cavity 11 through an inner surface of the cavity 11 of the mold 10, and can slightly vibrate the preform 2 at a high speed by applying the ultrasonic waves thereto.

In the case illustrated in figurers, although the vibration generator 40 is provided in the mold 10, it is not limited thereto, and its installation place may be changed in various manners as long as it can vibrate the preform 2. For example, the vibration generator 40 may be placed outside the mold 10, and apply ultrasonic waves to the mold 10 in a noncontact manner to slightly vibrate the preform 2 together with the mold 10 at a high speed. Further, the vibration generator 40 may be placed between the mold 10 and the nozzle unit 20 and apply ultrasonic waves to the mouth portion 2a of the preform 2 in a noncontact manner to slightly vibrate the preform 2 at a high speed. Moreover, the vibration generator 40 may be provided to the nozzle unit 20, and apply ultrasonic waves from the side of the nozzle unit 20 to the mouth portion 2a of the preform 2 in a noncontact manner to slightly vibrate the preform 2 at a high speed. Furthermore, when the vibration generator 40 is provided to the nozzle unit 20, the vibration generator 40 may apply ultrasonic waves to the nozzle unit 20 in a noncontact manner to slightly vibrate the preform 2 together with the nozzle unit 20 at a high speed.

It is to be noted that the vibration generator 40 is not limited to those generating ultrasonic waves, and may be those generating sonic waves with a frequency less than 20 kHz and vibrating the preform 2 by applying the sonic waves.

Further, in the case illustrated in figures, the vibration generator 40 is configured as an ultrasonic wave generator, which is configured to apply ultrasonic waves to the preform 2 in a noncontact manner to vibrate it. However, it is not limited thereto, and the vibration generator 40 may be configured to apply ultrasonic waves to the preform 2 in a state where the vibration generator 40 is in contact with the preform 2 (e.g., the mouth portion 2a) to vibrate the preform 2. It is also possible that ultrasonic waves are applied to the mold 10 with the vibration generator 40 provided outside the mold 10 being in contact with the mold 10 to vibrate the mold 10, and the vibration of the mold 10 is transmitted to the mouth portion 2a of the preform 2 such that the preform 2 is vibrated with the mold 10. Furthermore, it is also possible that ultrasonic waves are applied with the vibration generator 40 being in contact with a member (e.g., the blow nozzle 23) constituting the nozzle unit 20 to vibrate the preform 2 together with the member.

Operation of the nozzle unit 20, the seal body 26, the stretching rod 28, the pump 30, the opening-closing valves V1 and V2, the vibration generator 40 and the like are controlled by a controller (not illustrated) in an integrated manner. This control can be performed with reference to the values and the like of the pressure gauge 32. Preferably, the opening-closing valves V1 and V2 are each configured as a solenoid valve that can be controlled by the controller.

Next, a method of molding a liquid container C, which is a container of a predetermined shape containing a liquid (content liquid) L, from the synthetic resin preform 2 by using the liquid blow molding apparatus 1 configured in the above described manner (the liquid blow molding method according to this embodiment) will be described.

Figure 3:
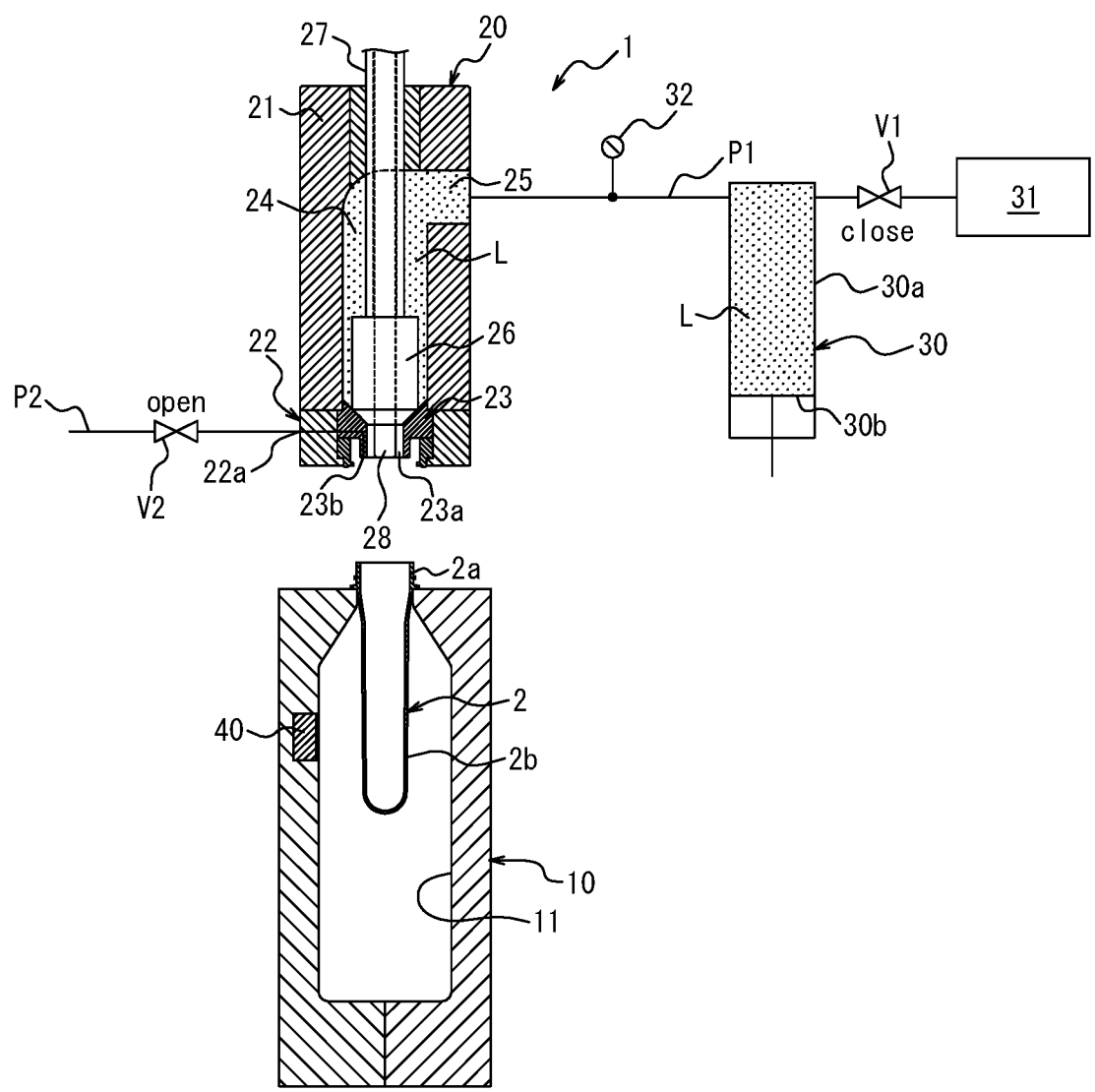
FIG. 3 is a diagram illustrating the liquid blow molding apparatus in a state where a preform is set in a mold.

First, as illustrated in FIG. 3, in a state where the nozzle unit 20 is separated upward from the mold 10 for blow molding, the synthetic resin preform 2 is placed in the mold 10 and is clamped, the preform 2 having been preheated, by using a heating means (not illustrated) such as a heater, to a predetermined temperature (e.g. from 80° C. to 150° C.) at which stretchability is achieved. When the clamping is finished, the preform 2 will be in a state where the mouth portion 2a projects upward from the upper surface of the mold 10 and the body portion 2b is placed inside the cavity 11.

When the preform 2 is placed in the mold 10, next, the nozzle engagement step is performed. In the nozzle engagement step, the nozzle unit 20 is displaced relatively toward the mold 10 to allow the blow nozzle 23 to be engaged with the mouth portion 2a of the preform 2 in a liquid-tight manner. FIGS. 1 and 2 illustrate a completion state of the nozzle engagement step where the blow nozzle 23 engages with the mouth portion 2a of the preform 2 in a liquid-tight manner. In the completion state of the nozzle engagement step, the seal body 26 and the opening-closing valve V1 are closed, and the opening-closing valve V2 is open. Further, the stretching rod 28 is held at its original position at which the stretching rod does not protrude downward from the blow nozzle 23.

Figure 4:
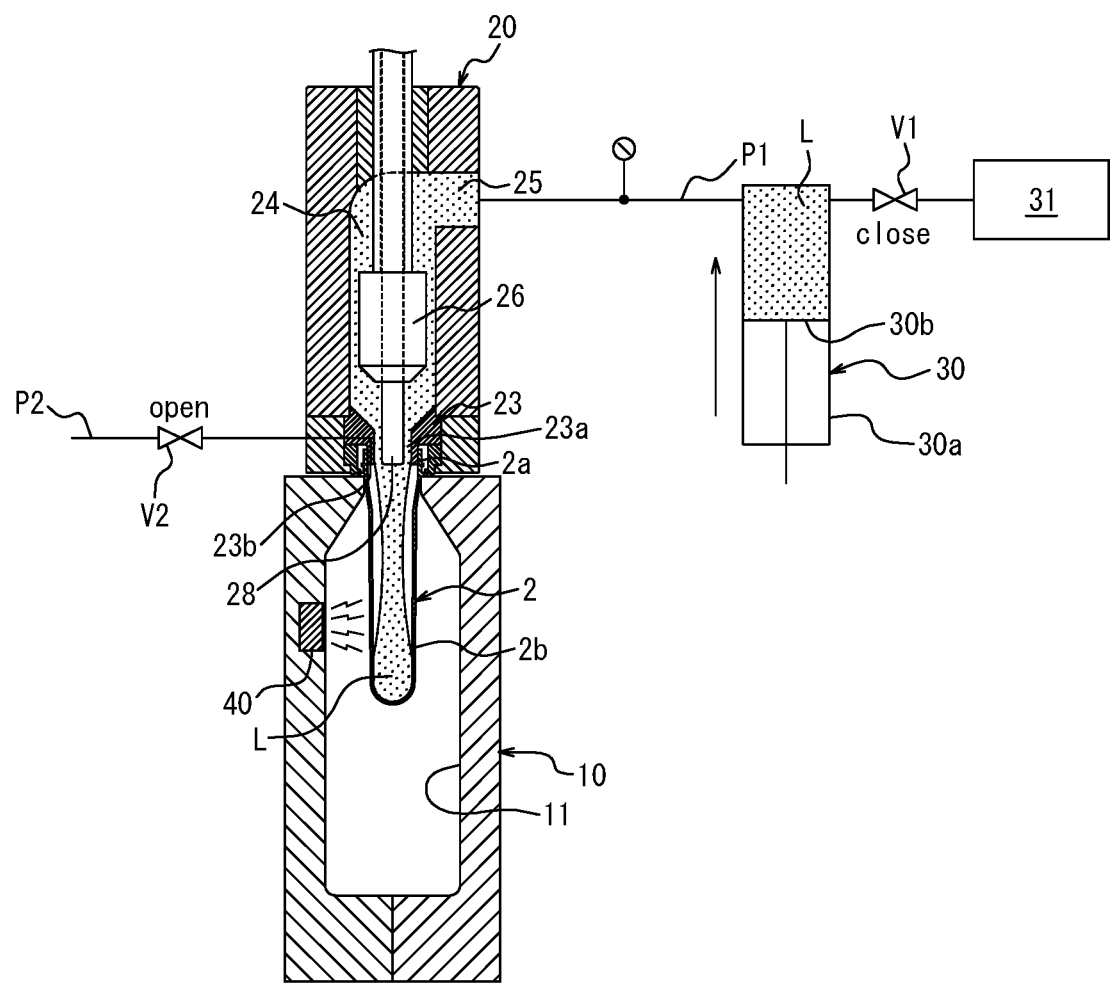
FIG. 4 is a diagram illustrating the liquid blow molding apparatus in a state where an air-liquid separation step is performed while an air-liquid replacement step is performed.

When the nozzle engagement step is completed, next, the air-liquid replacement step is performed. In the air-liquid replacement step, as illustrated in FIG. 4, the seal body 26 is displaced upward to open the liquid supply port 23a of the blow nozzle 23 with the opening-closing valve V2, that is, the discharge port 23b, open, and in that state the pump 30 is operated toward a positive direction (pressurized direction). When the pump 30 is operated, the liquid L is supplied into the preform 2 through the pipe P1, the supply port 25, the supply channel 24 and the liquid supply port 23a of the blow nozzle 23.

Figure 5:
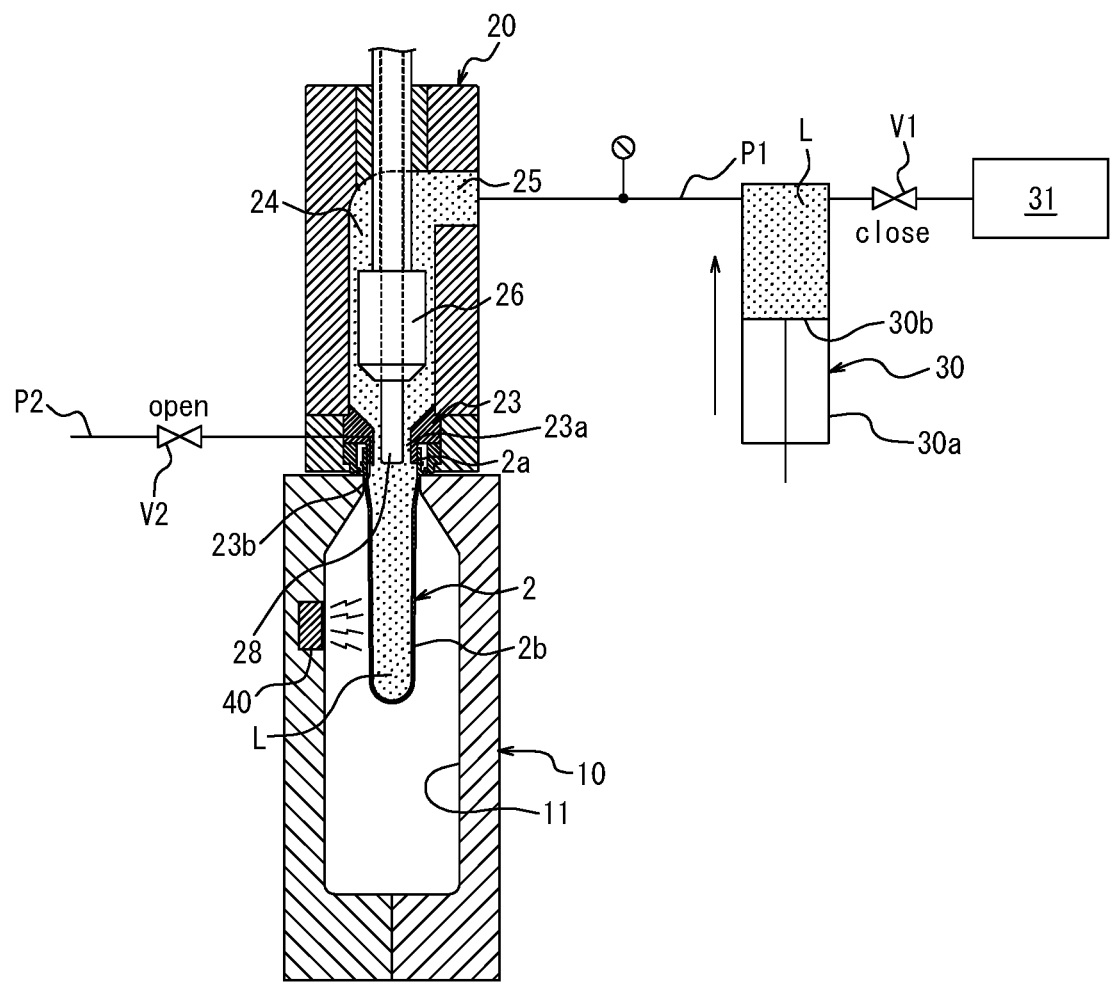
FIG. 5 is a diagram illustrating the liquid blow molding apparatus in a state where the air-liquid replacement step is completed.

Here, in the air-liquid replacement step, the liquid L is supplied into the preform 2 in a state where the discharge port 23b provided in the blow nozzle 23 is open and the preform 2 communicates with the discharge tank. Thus, the air inside the preform 2 is pushed out from the discharge port 23b toward the discharge tank as the liquid L is supplied into the preform 2, and the air inside the preform 2 is replaced with the liquid L. That is, the air-liquid replacement step allows the air inside the preform 2 to be replaced with the liquid L, and as illustrated in FIG. 5, allows the preform 2 having the shape before the blow molding is applied thereto to be filled with the liquid L.

In the air-liquid replacement step, preferably, a predetermined amount of liquid L is supplied into the preform 2 at a pressure lower than that of the blow molding step described below. That is, in the air-liquid replacement step, preferably, output of the pump 30 is adjusted such that the liquid L is supplied at a pressure with which the preform 2 is not liquid blow molded or is liquid blow molded a little.

In the disclosed liquid blow molding method, in order to reduce the amount of the air remaining in the preform 2 after the air-liquid replacement step, the air-liquid separation step is performed before the preform 2 is blow molded. In the air-liquid separation step, the vibration generator 40 is operated to vibrate the preform 2, and the air is separated from the liquid L inside the preform 2. In particular, according to this embodiment, the preform 2 is slightly vibrated at a high speed by operating the vibration generator 40 to apply ultrasonic waves to the preform 2. Thus the air is separated from the liquid L in the preform 2. When the air is separated from the liquid L in the preform 2, the air mixed in the liquid L is displaced to the mouth portion 2a side of the preform 2, and is discharged efficiently to the outside from the discharge port 23b provided in the blow nozzle 23.

In this embodiment, the air-liquid separation step is performed while the air-liquid replacement step is performed. That is, in this embodiment, as illustrated in FIGS. 4 and 5, the air-liquid replacement step is performed in a state where the preform 2 is vibrated by the vibration generator 40, and the liquid L is supplied into the vibrating preform 2 through the liquid supply port 23a of the blow nozzle 23. The liquid L supplied into the preform 2 is separated from the air by the vibration of the preform 2, and accumulates on the bottom side of the preform 2. On the other hand, the air mixed in the liquid L is separated from the liquid L by the vibration, is displaced to the upper part of the preform 2, and is discharged from the discharge port 23b that is provided in the blow nozzle 23 separately from the liquid supply port 23a. In this manner, since the liquid L is supplied into the preform 2 while the preform 2 is vibrated, inside the preform 2 can be filled with the liquid L while the air mixed in the liquid L is separated from the liquid L and efficiently discharged from the discharge port 23b to the outside. Therefore, the amount of the air remaining in the preform 2 after the air-liquid replacement step can be reduced.

In particular, when the liquid L is a liquid with a relatively high viscosity such as shampoo or liquid detergent, for example, the liquid L containing the air is supplied into the preform 2, or the liquid L supplied into the preform 2 entrains the air inside the preform 2 and results in a state where the liquid L contains a lot of air. However, even in such a case, when the air-liquid separation step is performed, the air mixed in the liquid L is separated from the liquid L and is efficiently discharged from the discharge port 23b to the outside.

In the disclosed liquid blow molding method, the air-liquid separation step may be performed after completion of the air-liquid replacement step, not during the air-liquid replacement step. Even in this case, when the preform 2 filled with the liquid L in the air-liquid replacement step is vibrated in the air-liquid separation step, the air mixed in the liquid L can be separated from the liquid L and discharged from the discharge port 23b to the outside. Therefore, the amount of the air remaining in the preform 2 after completion of the air-liquid replacement step can be reduced.

It is to be noted that the air-liquid separation step can be performed continuously over the period of during the air-liquid replacement step and after completion of the air-liquid replacement step.

In this manner, in the liquid blow molding method according to the present embodiment, when the preform 2 is vibrated in the air-liquid separation step, the air mixed in the liquid L in the preform 2 can be separated from the liquid L and efficiently discharged from the discharge port 23b to the outside. Thus, the amount of the air remaining in the preform 2 after completion of the air-liquid replacement step can be reduced.

Figure 6:
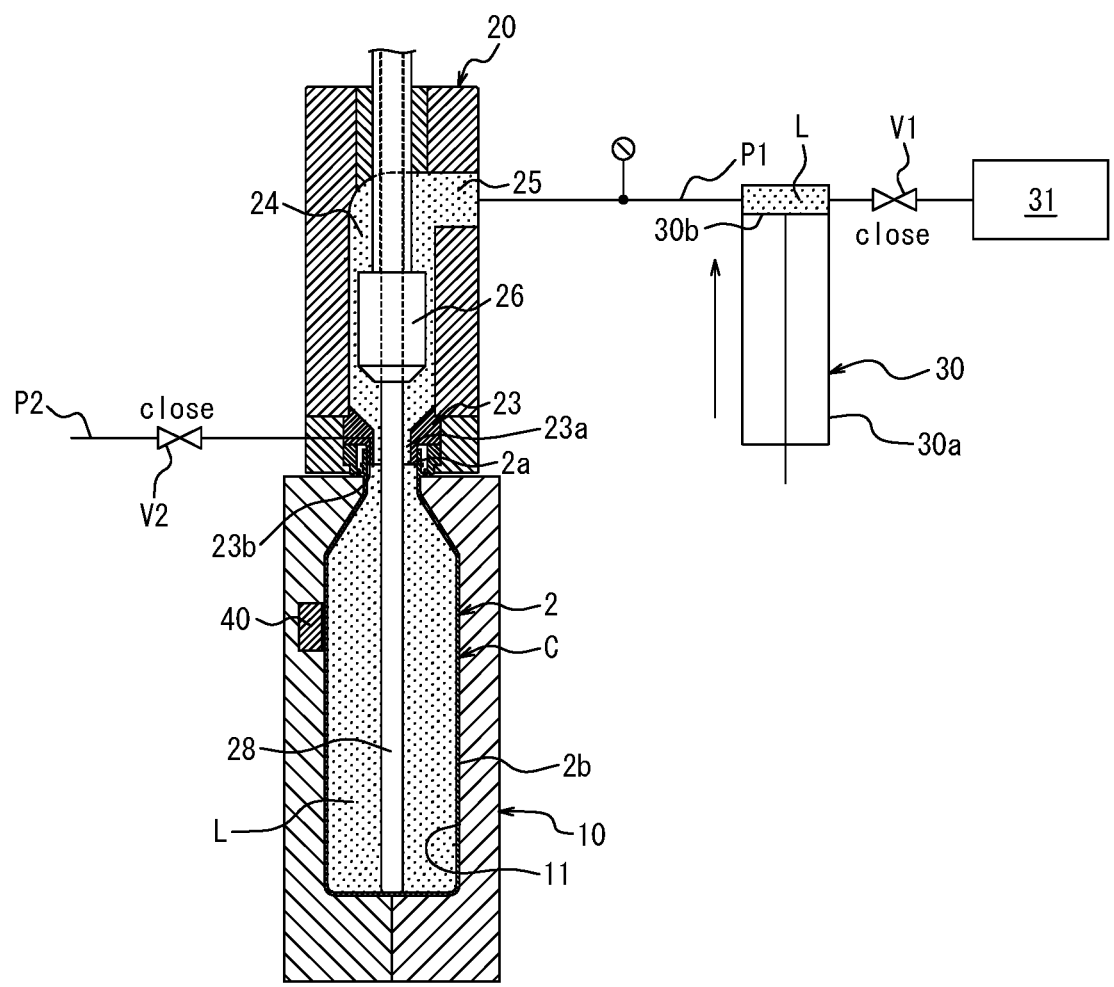
FIG. 6 is a diagram illustrating the liquid blow molding apparatus in a state where a blow molding step is performed.

When the air-liquid replacement step and the air-liquid separation step are completed, next, the blow molding step is performed. In the blow molding step, as illustrated in FIG. 6, the pump 30 is operated further in the positive direction with the opening-closing valves V1 and V2 closed and the liquid supply port 23a remained open by the seal body 26. At this time, the pump 30 is operated with an output that allows the pressure of the liquid L supplied to the preform 2 to be a predetermined pressure at which the preform 2 can be liquid blow molded. In this manner, when the liquid L pressurized to a predetermined pressure is further supplied into the preform 2 filled with the liquid L, the preform 2 is stretched in an expansion manner by the pressure of the liquid L. Further, as illustrated in FIG. 6, when the preform 2 is molded (liquid blow molded) into a liquid container C conforming to the inner surface of the cavity 11, operation of the pump 30 is stopped and the blow molding step is completed.

Here, as described above, the air inside the preform 2 is replaced with the liquid L in the air-liquid replacement step, and the amount of the air remaining in the preform 2 is further reduced by performing the air-liquid separation step. Thus, bubbling of the liquid L inside the preform 2 caused by entraining of the air into the liquid L that is supplied into the preform 2 in the blow molding process can be prevented. In this manner, it is possible to stabilize the molding conditions and enhance the moldability of the container. Consequently, a liquid container C can be manufactured precisely and at a low cost such that it has a predetermined content volume and a shape.

When the stretching rod 28 is provided to the liquid blow molding apparatus 1, the stretching rod 28 is displaced forward into the preform 2 in the blow molding step, and the preform 2 is stretched in the axial (longitudinal) direction by the stretching rod 28. In this manner, a biaxial stretch blow molding in which a preform 2 is biaxially stretched by a pressure of the liquid L and the stretching rod 28 can be performed. According to the biaxial stretch blow molding, the preform 2 can be molded in a liquid container C of a predetermined shape more precisely.

In the present embodiment, after the blow molding step is completed, the suck-back step is performed.

Figure 7:
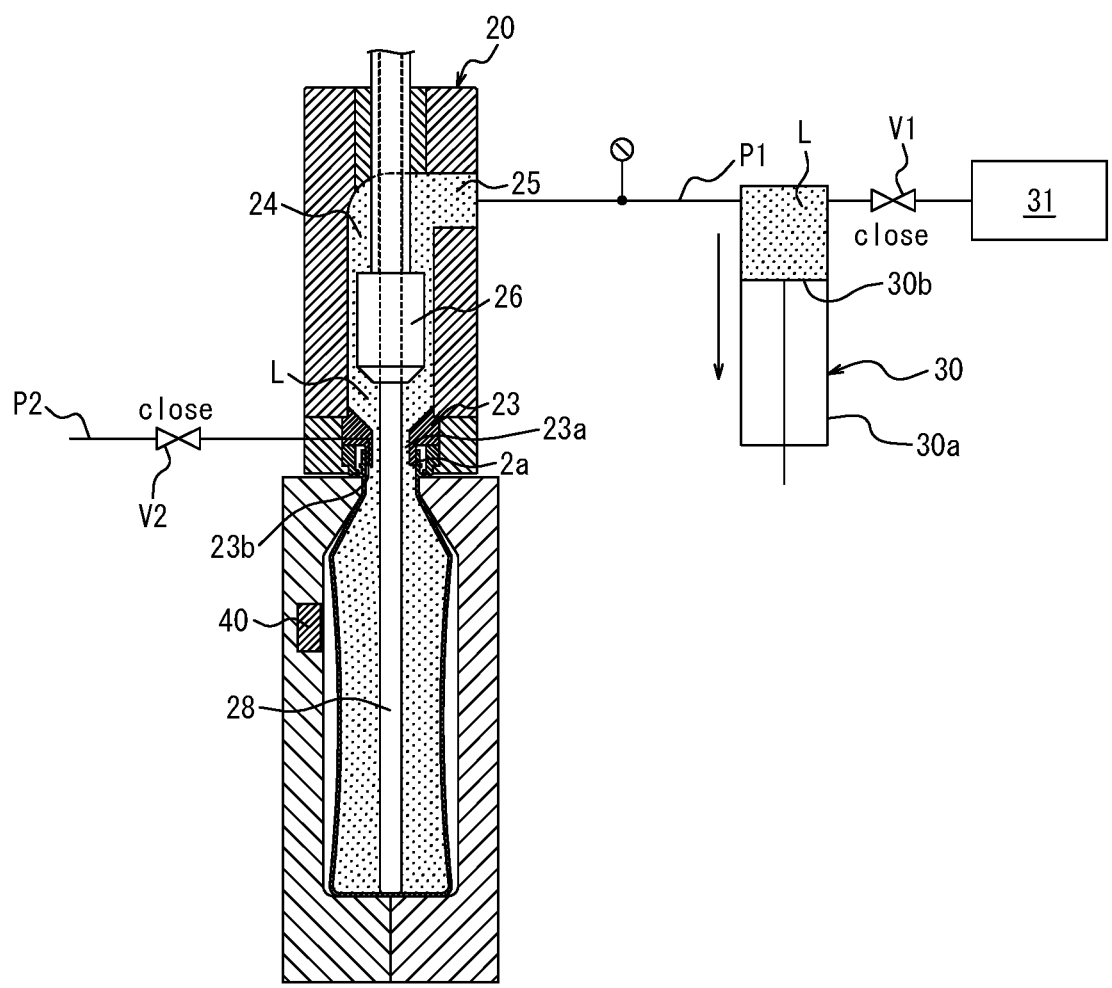
FIG. 7 is a diagram illustrating the liquid blow molding apparatus in a state where a suck-back step is performed.

As illustrated in FIG. 7, in the suck-back step, the seal body 26 is at an open position and the liquid supply port 23a of the blow nozzle 23 is kept open. In this state the pump 30 is operated in the reverse direction and a predetermined amount of liquid L is sucked back from the liquid container C molded into a predetermined shape in the blow molding step to the supply channel 24 through the liquid supply port 23a. The amount of the liquid L sucked back to the supply channel 24 in the suck-back step is appropriately set such that a head space HS provided in a completed liquid container C has a predetermined amount. When the suck-back step is performed, the content volume of the liquid container C is reduced by the amount of the liquid L sucked back to the supply channel 24. Then, the liquid container C is deformed due to volume reduction, and in which sate a gap is generated between the container C and the cavity 11. The inside thereof is in a state of negative pressure that is lower than the atmospheric pressure.

In this state, the amount of the air remaining in the preform 2 is further reduced by replacing the air in the preform 2 with the liquid L in the air-liquid replacement step and performing the air-liquid separation step. Thus, even if the liquid L is sucked back from the liquid container C into the supply channel 24, not much air is mixed in the liquid L in the supply channel 24, and deterioration of moldability or the like will not occur in the subsequent liquid blow molding step.

Figure 8:
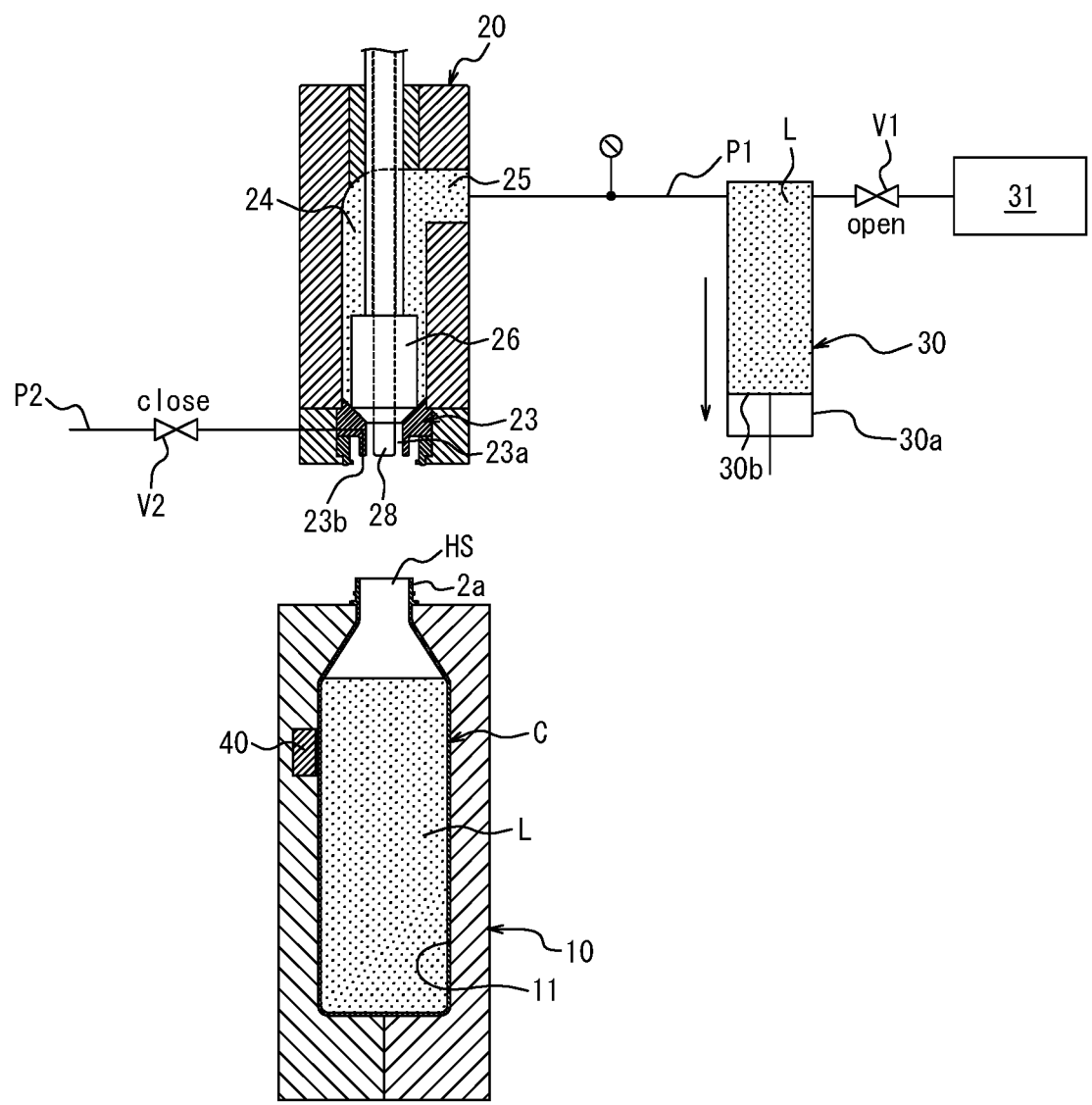
FIG. 8 is a diagram illustrating the liquid blow molding apparatus in a state where a blow nozzle is removed from a mouth portion of a container after molding.

When the suck-back step is completed, next, the liquid supply port 23a of the blow nozzle 23 is closed by the seal body 26 with a predetermined amount of liquid L sucked back from the inside of the liquid container C molded into a predetermined shape to the supply channel 24 in the suck-back step. Then after that, as illustrated in FIG. 8, the nozzle unit 20 is displaced relatively in the direction separating from the mold 10, and the blow nozzle 23 is separated from the mouth portion 2a of the preform 2 to release engagement with the mouth portion 2a of the blow nozzle 23. When the blow nozzle 23 is separated from the mouth portion 2a of the liquid container C after molding, the liquid container C, which is in a state of deformation due to volume reduction in the suck-back step, is restored to its original shape, and a head space HS having a predetermined volume is formed above a predetermined amount of liquid L inside the liquid container C. It is to be noted that a head space HP may also be formed by opening the opening-closing valve V2 before the blow nozzle 23 is separated to allow communication with the air such that the liquid container C deformed due to volume reduction in the suck-back step is restored to its original shape.

Further, in the above described state, a cap is attached to the mouth portion 2a by a capping apparatus not illustrated, and subsequently the mold 10 is opened to eject a completed liquid container C from the mold 10. It is to be noted that a cap is attached after the liquid container C is ejected from the mold 10.

When the stretching rod 28 is provided to the liquid blow molding apparatus 1, the stretching rod 28 may be pulled out from the liquid container C after the liquid supply port 23a of the blow nozzle 23 is closed by the seal body 26. In this manner, compared with the case where the stretching rod 28 is not provided to the liquid blow molding apparatus 1, a volume of the head space HS can be increased further by the volume of the stretching rod 28. In this case, the amount of liquid L sucked back from the liquid container C to the supply channel 24 in the suck-back step may be set in consideration of the volume of the stretching rod 28 inserted into the liquid container C.

As described above, in the liquid blow molding method according to the present embodiment, the air inside the preform 2 is replaced with the liquid L in the air-liquid replacement step, and the amount of the air remaining in the preform 2 is further reduced by performing the air-liquid separation step. In this manner, bubbling of the liquid L in the preform 2 caused by entrainment of the air into the liquid L that is supplied into the preform 2 in the blow molding step is prevented, and the liquid container C can be manufactured precisely and at a low cost such that it has a predetermined content volume and a shape.

At this time, in the air-liquid replacement step, a predetermined amount of liquid L is supplied into the preform 2 at a pressure lower than that in the liquid blow molding. Thus the air in the preform 2 can be replaced with the liquid L without causing bubbling of the liquid L.

Further, in the liquid blow molding method according to the present embodiment, since the air-liquid separation step is performed while the air-liquid replacement step is performed, the air is efficiently separated from the liquid L supplied to the preform 2, and the amount of the air remaining in the preform 2 can be further reduced.

Moreover, when the air-liquid separation step is performed after the air-liquid replacement step is completed, the air remaining on the bottom of the preform 2 is also reliably separated from the liquid L. In this manner, the amount of the air remaining in the preform 2 can be further reduced.

Furthermore, in the liquid blow molding method according to the present embodiment, ultrasonic waves are applied to the preform 2 or the mold 10 in the air-liquid separation step to vibrate the preform 2, which allows the preform 2 to be slightly vibrated at a high speed. In this manner, the air is separated from the liquid L supplied to the preform 2 in a more efficient manner.

Moreover, when a vibration body is brought into contact with the preform 2 or the mold 10 to slightly vibrate the preform 2 in the air-liquid separation step, a strong vibration can be applied to the preform 2, and even in a case where the viscosity of the liquid L is high, the air can be efficiently separated from the liquid L supplied to the preform 2.

Furthermore, in the liquid blow molding method according to the present embodiment, the method has, before the air-liquid replacement step, the nozzle engagement step of engaging the blow nozzle 23 with the mouth portion 2a, and in the air-liquid replacement step, the air inside the preform 2 is discharged to the outside from the discharge port 23b provided separately from the liquid supply port 23a in the blow nozzle 23 while the liquid L is supplied into the preform 2 from the mouth portion 2a through the liquid supply port 23a of the blow nozzle 23. Thus the air inside the preform 2 can be discharged to the outside without leaking the liquid L to the outside.

The present disclosure is not limited to the above described embodiment, and it is needless to say that various modifications may be made without departing from the spirit of the present disclosure.

For example, although the above described embodiment illustrates a case where the disclosed liquid blow molding method is performed by using the liquid blow molding apparatus 1 configured as illustrated in FIG. 1, the disclosed liquid blow molding method may be performed by using a liquid blow molding apparatus and the like configured in another manner.

Further, in the above described embodiment, although the discharge port 23b configured to discharge the air inside the preform 2 to the outside in the air-liquid replacement step is provided to the blow nozzle 23, it may be provided to the other part such as the stretching rod 28, for example.

Furthermore, in the above described embodiment, ultrasonic waves generated by the vibration generator 40 provided in the mold 10 are applied to the preform 2 in a noncontact manner to slightly vibrate the preform 2 at a high speed in the air-liquid separation step. However, it is not limited thereto, and for example, as long as the preform 2 can be vibrated, the preform 2 may be slightly vibrated at a high speed by bringing the vibration generator 40 into contact with the preform 2 (e.g., the mouth portion 2a); ultrasonic waves generated by the vibration generator 40 disposed outside the mold 10 are applied to the mold 10 in a contact or noncontact manner to slightly vibrate the preform 2 together with the mold 10 at a high speed; ultrasonic waves generated by the vibration generator 40 disposed between the mold 10 and the nozzle unit 20 are applied to the mouth portion 2a of the preform 2 in a contact or noncontact manner to slightly vibrate the preform 2 at a high speed; ultrasonic waves generated by the vibration generator 40 provided to the nozzle unit 20 are applied to the mouth portion 2a of the preform 2 in a contact or noncontact manner to slightly vibrate the preform 2 at a high speed; or ultrasonic waves generated by the vibration generator 40 provided outside the nozzle unit 20 are applied to the nozzle unit 20 in a contact or noncontact manner to slightly vibrate the preform 2 together with the nozzle unit 20 at a high speed. Further, sonic waves applied to the preform 2 are not limited to ultrasonic waves, and may be sonic waves with a frequency of less than 20 kHz.

Moreover, in the above described embodiment, the preform 2 is slightly vibrated by ultrasonic waves, which are vibrations generated by the vibration generator 40, at a high speed. However, vibrations generated by the vibration generator 40, that is, a method of generating vibrations applied to the preform 2 by the vibration generator 40 and the amplitude number or the amplitude can be appropriately changed as long as the air can be separated from the liquid L in the preform 2 by vibrating the preform 2.

Furthermore, in the above described embodiment, although, in the air-liquid replacement step, the air in the preform 2 is discharged to the outside from the discharge port 23b provided in the blow nozzle 23, it is not limited thereto, and the blow nozzle 23 may be lowered to the first position at which the mouth portion 2a is not sealed (a first nozzle lowering step) before the air-liquid replacement step, and, in the air-liquid replacement step, the air in the preform 2 may be discharged to the outside from a gap between the blow nozzle 23 and the mouth portion 2a while the liquid L is supplied into the preform 2 from the mouth portion 2a through the blow nozzle 23 located at the first position. In this case, after the air-liquid replacement step, the blow nozzle 23 is lowered to the second position at which the mouth portion 2a is sealed (a second nozzle lowering step), and after that the blow molding step is performed. In this manner, the need to provide the discharge port 23b in the blow nozzle 23 is eliminated, thus the configuration of the liquid blow molding apparatus 1 is simplified, and a manufacturing cost of the liquid container C molded according to the liquid blow molding method can be reduced.

Moreover, in the above described embodiment, although a head space HS is increased by performing a biaxial stretch blow molding by using the stretching rod 28 in the blow molding step and pulling out the stretching rod 28 from the liquid container C as well, a head space HS may not be formed by using the stretching rod 28 (e.g., the stretching rod 28 may be pulled out before the blow molding step is finished).

Furthermore, in the above described embodiment, although the pump 30 is a plunger pump, it is not limited thereto, and a variety of pumps may be used as long as the liquid L can be supplied to the preform 2 by being pressurized to a predetermined pressure and a predetermined amount of liquid L can be sucked back from a liquid container C after molding.

Moreover, the disclosed liquid blow molding method may preferably be applied to a case where a container needed to be provided with a large head space HS therein, such as a liquid container C used for a container with a pump configured to contain a content liquid with a relatively high viscosity such as shampoo, liquid detergent, and the like, is molded. However, the method may be applied to mold a variety of liquid containers C regardless of the size of the head space HS.

Furthermore, although the air-liquid separation step may be performed during or after the blow molding step, in principle, the blow molding step is performed with the preform 2 sealed. Therefore it is difficult to discharge the air separated from the liquid L to the outside. Thus, the air-liquid separation step may preferably be performed at the same time with the air-liquid replacement step, or after the air-liquid replacement step and before the blow molding step.

REFERENCE SIGNS LIST

1 Liquid blow molding apparatus
2 Preform
2a Mouth portion
2b Body portion
10 Mold
11 Cavity
20 Nozzle unit
21 Main body block
22 Support block
22a Connection port
23 Blow nozzle
23a Liquid supply port
23b Discharge port
23c Connection channel
24 Supply channel
25 Supply port
26 Seal body
27 Shaft body
28 Stretching rod
30 Pump
30a Cylinder
30b Piston
31 Supply tank
40 Vibration generator
P1 Pipe
V1 Opening-closing valve
P2 Pipe
V2 Opening-closing valve
C Liquid container

The invention claimed is:

1. A liquid blow molding method of molding a synthetic resin preform having a mouth portion into a liquid container of a predetermined shape, the method comprising:
an air-liquid replacement step of supplying a liquid into the preform from the mouth portion through a blow nozzle and discharging the air inside the preform to an outside;
an air-liquid separation step of separating the air from the liquid inside the preform by vibrating the preform without stretching the preform by a pressurized liquid; and
a blow molding step of molding the preform into a container of a predetermined shape by supplying, after the air-liquid separation step, the pressurized liquid into the preform from the mouth portion through the blow nozzle,
wherein the liquid supplied into the preform in the air-liquid replacement step is a content liquid contained in the liquid container after molding.

2. The liquid blow molding method according to claim 1, wherein the air-liquid separation step is also performed while the air-liquid replacement step is performed.

3. The liquid blow molding method according to claim 1, wherein the air-liquid separation step is performed after the air-liquid replacement step is completed.

4. The liquid blow molding method according to claim 1, wherein, in the air-liquid separation step, the preform is vibrated by applying ultrasonic waves to the preform or a mold in which the preform is placed.

5. The liquid blow molding method according to claim 1, wherein, in the air-liquid separation step, the preform is vibrated by bringing a vibration body into contact with the preform or the mold in which the preform is placed.

6. The liquid blow molding method according to claim 1, further comprising:
a nozzle engagement step of engaging the blow nozzle with the mouth portion, before the air-liquid replacement step, wherein,
in the air-liquid replacement step, the air inside the preform is discharged to the outside from a discharge port provided separately from a liquid supply port in the blow nozzle while a liquid is supplied into the preform from the mouth portion through the liquid supply port of the blow nozzle.

7. The liquid blow molding method according to claim 1, further comprising:
a first nozzle lowering step of lowering the blow nozzle to a first position at which the mouth portion is not sealed, before the air-liquid replacement step; and
a second nozzle lowering step of lowering the blow nozzle to a second position at which the mouth portion is sealed, after the air-liquid replacement step, wherein,
in the air-liquid replacement step, the air inside the preform is discharged to the outside from a gap between the blow nozzle and the mouth portion while a liquid is supplied into the preform from the mouth portion through the blow nozzle located at the first position; and
the blow molding step is performed after the second nozzle lowering step.

8. The liquid blow molding method according to claim 1, further comprising:
a suck-back step of sucking back a predetermined amount of liquid from the container after molding through the blow nozzle, after the blow molding step.

* * * * *